United States Patent [19]

Hall

[11] Patent Number: 5,015,023

[45] Date of Patent: May 14, 1991

[54] AUTOMATIC CABLE GRIPPING DEVICE

[76] Inventor: Gaddis G. Hall, P.O. Box 835, Trussville, Ala. 35173

[21] Appl. No.: 420,170

[22] Filed: Dec. 11, 1989

[51] Int. Cl.[5] .......................... B66C 1/44; F16G 11/10
[52] U.S. Cl. ............................... 294/102.1; 24/115 G; 24/136 R
[58] Field of Search .................... 294/102.1; 24/115 R, 24/115 G, 115 M, 136 R, 136 L; 188/65.1, 65.2, 67

[56] References Cited

U.S. PATENT DOCUMENTS

| | | | |
|---|---|---|---|
| 1,159,096 | 11/1915 | Rigby | 24/136 R |
| 1,590,280 | 6/1926 | Buchanan | 294/102.1 |
| 1,720,037 | 7/1929 | Entwistle et al. | 294/102.1 X |
| 2,699,589 | 1/1955 | Redell | 294/102.1 |
| 3,776,586 | 12/1973 | Ahlgren et al. | 294/102.1 |
| 4,031,830 | 6/1977 | Hirt et al. | 24/115 G X |
| 4,463,481 | 8/1984 | Rastetter et al. | 188/67 |

Primary Examiner—Margaret A. Focarino
Assistant Examiner—Dean J. Kramer
Attorney, Agent, or Firm—Jennings, Carter, Thompson & Veal

[57] ABSTRACT

An automatic, lockable, and releasable range-taking cable connection for use in pole line application utilizes a pair of spring loaded gripper elements movable on inclined planar surfaces within a housing, with the gripper elements connected to a retractor mechanism that translates rotational motion of a retractor into axial movement of the grippers to release the same from the cable. A rotatable locking sleeve or cap is used to secure the gripper elements in locked position when in normal use.

25 Claims, 4 Drawing Sheets

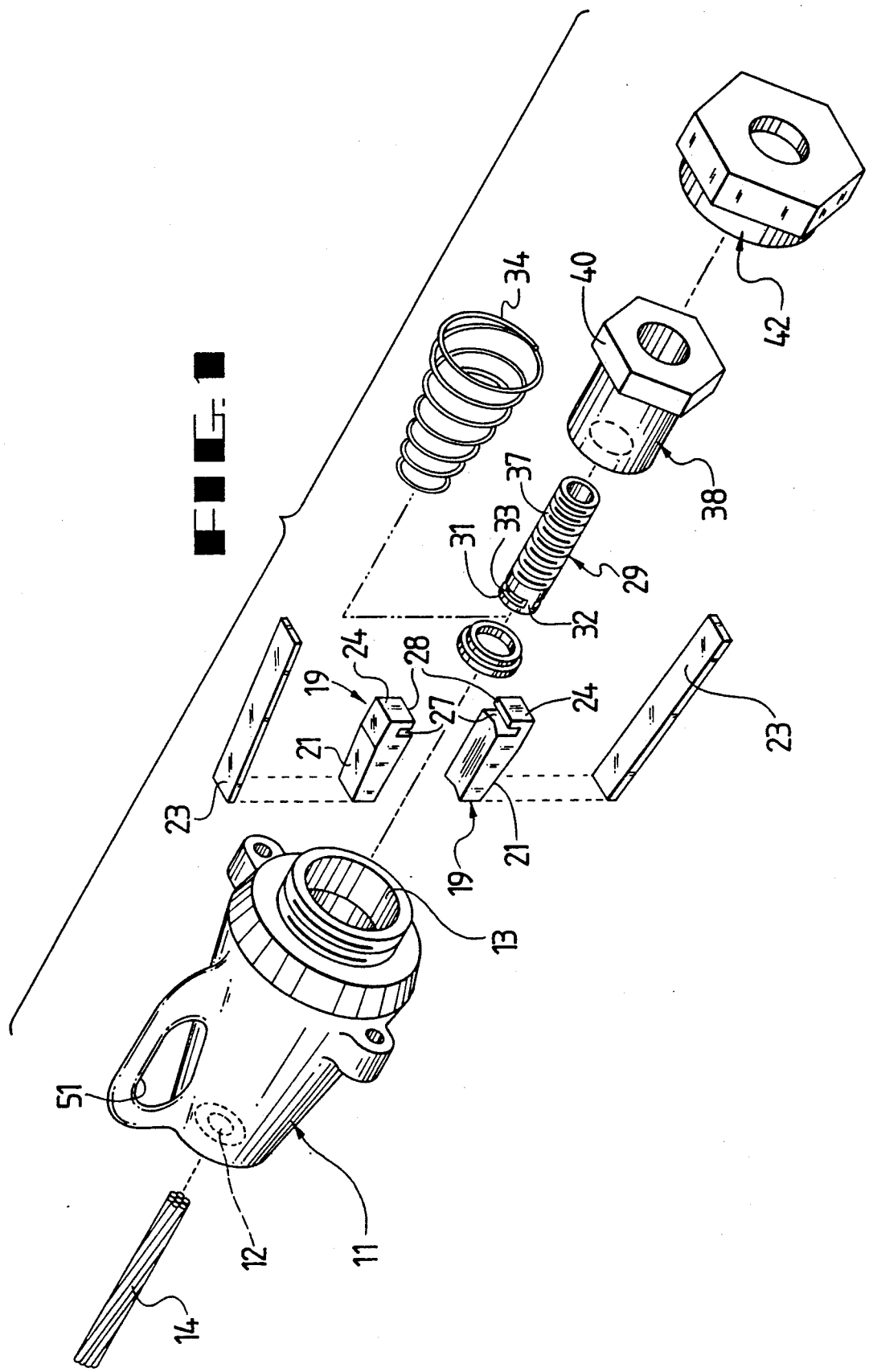

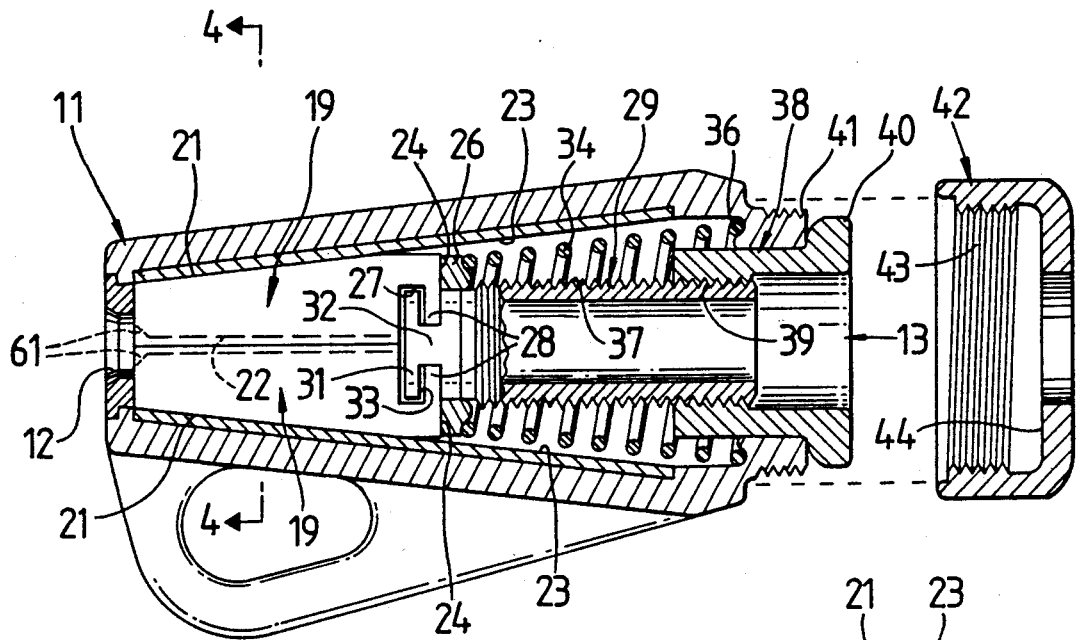
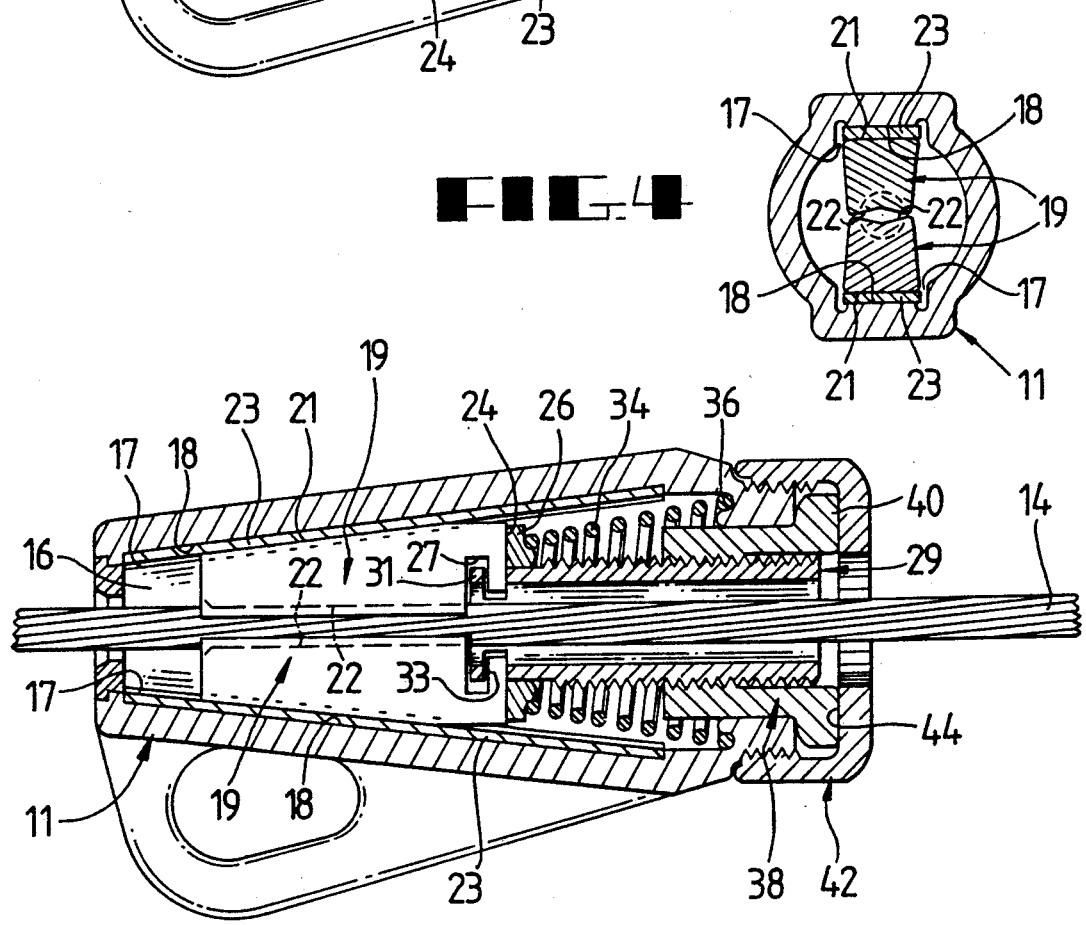

AUTOMATIC CABLE GRIPPING DEVICE

FIELD OF THE INVENTION

The present invention relates to pole line hardware and further relates to the class of devices which will, upon insertion of a cable, wire or conductor, initiate and maintain a continuous gripping action to prevent premature release of the cable. More particularly the present invention relates to such devices which are also range taking in the sense that cables of various diameters may be accommodated by the device.

BACKGROUND OF THE INVENTION

Devices are known in the art which purport to grip a cable inserted therein and they are to some extent useful. The devices known to the inventor are, however, non-range taking and provide no means for insuring that the cable remains within the holder when subjected to impact or severe vibration or loss of tension in the cable, such as may occur when a pole is hit by a vehicle, when lines are crossed by fallen trees, or when violent gusty winds occur. The known devices employ a housing having a frusto-conical cavity therein within which a set of conical segments are free to move axially. The conical segments have a combined outer diameter which causes them to wedge against the housing at a predetermined minimum diameter, and when so wedged, the sides of the segment abut to form a cone with an axial bore therethrough. As will be appreciated, this structure imposes a strict limit on the cable size which can be properly gripped for a given device. Accordingly, prior practice has been to build a plurality of devices of varying size to handle a variety of cable sizes.

Yet another problem with the prior art are two opposite extremes which may occur in operation. One extreme occurs when the gripper elements become so tightly wedged in the housing that they cannot be removed, thus the device is not reusable. The other extreme occurs when the tension in the cable is lost and the grippers move into a larger volume inside the housing such that the gripping action is lost and the cable escapes the gripper or moves axially in the device. When tension is restored to the cable, obviously untoward results may occur.

SUMMARY OF THE INVENTION

It is an object of the present invention to provide a cable gripping device which is automatic in the sense that it grips and retains the cable upon insertion thereof into the device.

Another object of the invention is to provide a device which is range taking such that a number of different cable diameters may be accommodated by a single device.

Yet another object of the invention is to provide such a device which will not loosen its grip on the cable due to adverse conditions or loss of tension in the cable.

Still another object of the invention is to provide such a device wherein the grippers may be retracted to release the cable such that the apparatus is reusable.

An object of the invention and of each of the above objects is to make it easier for the lineman to secure the cable, thereby promoting efficiency in installation, maintenance and cost management.

The present invention accomplishes these objects as well as other novel advantages through the unique utilization of a plurality of component parts, one of the most significant of which is the gripper element itself. In contrast to the prior art, the gripper element is not conical but rather is planar and moves in a planar longitudinally extending guideway. The gripper elements are wedge-shaped members which do not encircle the cable and are attached to a gripper guide and retractor which can retract the grippers from their cable-engaging position. Numerous other features of the novel construction will become apparent from a study of the appended drawings and the description of the preferred embodiments.

BRIEF DESCRIPTION OF THE DRAWINGS

Apparatus embodying features of my invention are disclosed in the accompanying figures which form a portion of this disclosure and wherein:

FIG. 1 is an exploded perspective of the apparatus with the component parts separated for purposes of illustration;

FIG. 2 is a sectional view taken perpendicular to the longitudinal centerline of the apparatus showing the locking cover removed;

FIG. 3 is a section view taken as in FIG. 2 with the locking cover secured to the housing;

FIG. 4 is a sectional view taken along line 4—4 of FIG. 2;

DESCRIPTION OF THE PREFERRED EMBODIMENTS

Figure 5:
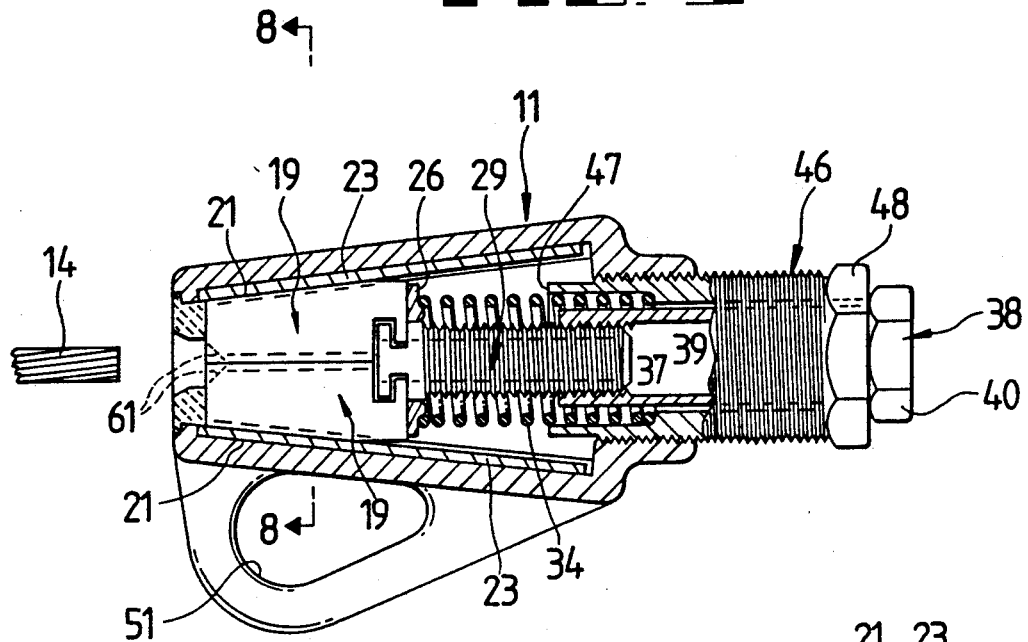
FIG. 5 is a sectional view of a second embodiment of the apparatus taken perpendicular to the longitudinal centerline of the apparatus.

Referring to the drawings for a clearer understanding of the invention it may be seen in FIG. 1 that the apparatus includes a housing 11 which defines a substantially conical cavity extending from a minor opening 12 to a major opening 13, that is a smaller end to a larger end and being open at both ends. A cable 14 is received through the minor opening 12 for retention within the housing 11. As used herein, the term cable means any cable, wire, conductor or like element which would be placed under tension in an electrical distribution system or the like. The housing 11 has an inner surface 16 which is generally frusto-conical extending from its apex near the minor opening 12 to its base at the major opening 13. Formed in the inner surface 16 are a pair of opposed rectangular guide recesses 17 which have a planar surface 18 inclined substantially parallel to the inner surface 16 and aligned longitudinally to the housing 11. Cooperatively positioned for sliding movement within and along the recesses 17 are a pair of gripper elements 19, each of which have a planar outer surface 21 aligned with surface 18 and a cable engaging surface 22 substantially parallel to the longitudinal axis of the housing 11. To facilitate the sliding of the gripper elements 19, to reduce wear, and to reduce the need to machine planar surface 18, a pair of smooth metallic pressure bearing slides 23 may be fitted into the recesses 17 intermediate the planar surface 18 and the gripper elements 19.

As may be seen in the figures, the gripper elements 19 are not conic sections but rather are wedge shaped, tapering toward the minor opening 12 of the housing. A flat bearing surface 24 perpendicular to the longitudinal axis of the housing is formed in the larger end of the gripper elements 19 and abuts an annular bearing member 26 or spring bearing washer. Proximal the larger end of the gripper elements 19 and opening toward the center of the housing is a groove or recess 27 which extends transversely across the width of the gripper element 19, forming a tab 28 between the flat bearing surface 24 and the groove 27.

A tubular retractor guide 29 extends concentrically through the annular bearing member 26. The retractor guide has an inner end which forms an annulus 31 and stirrup 32 combination such that the stirrup 32 connects the annulus 31 to the remainder of the retractor 29 and defines a spaced region 33 between the annulus 31 and the retractor 29. As may be seen in FIGS. 2, 3, 5, 6 and 8, the annulus 31 is sized to fit into the groove 27 and the tab 28 fits into the spaced region 33 such that the gripper elements 19 and retractor are connected for concomitant annular and axial movement, however the gripper elements 19 may move radially relative to the retractor 29 without disengaging therefrom. The outer surface of the retractor 29 is threaded as at 37. Mounted concentrically about the retractor 29 and abutting the annular bearing member 26 is a compression spring 34 which, as shown in FIGS. 2 and 4, is a somewhat conical spring with the end thereof distal the annular bearing member 26 resting in an axially opening internal groove 36 formed internally of the housing 11 at the base of the cavity. As may be seen this spring 34 biases the gripper elements towards the apex of the cavity.

A second tubular element or retractor 38, having an internal threaded surface 39, cooperatively engages the retractor guide 29 such that rotation of the retractor 38 causes the retractor guide 29 to move axially within the retractor 38, thus moving the gripper elements 19 axially within the housing 11. The retractor 38 has an outer end on which a radially extending flange 40 or head is formed for cooperative engagement thereof by a turning tool such as a wrench. Note in FIG. 2 and 3 that the flange 40 has an outside diameter greater than the inside diameter of the housing 11 at the major opening 13 and that the housing is threaded as at 41 on its outer surface proximal the major opening 13. An annular cap 42 having an internal threaded surface 43 and a sufficient axial depth to enclose the flange 40 is provided and can be threadedly engaged on the threads 41 of housing 11 such that the retractor 38 is confined within the housing 11 and cap 42 with the inner surface 44 of the cap 42 holding flange 40 against the housing.

Figure 6:
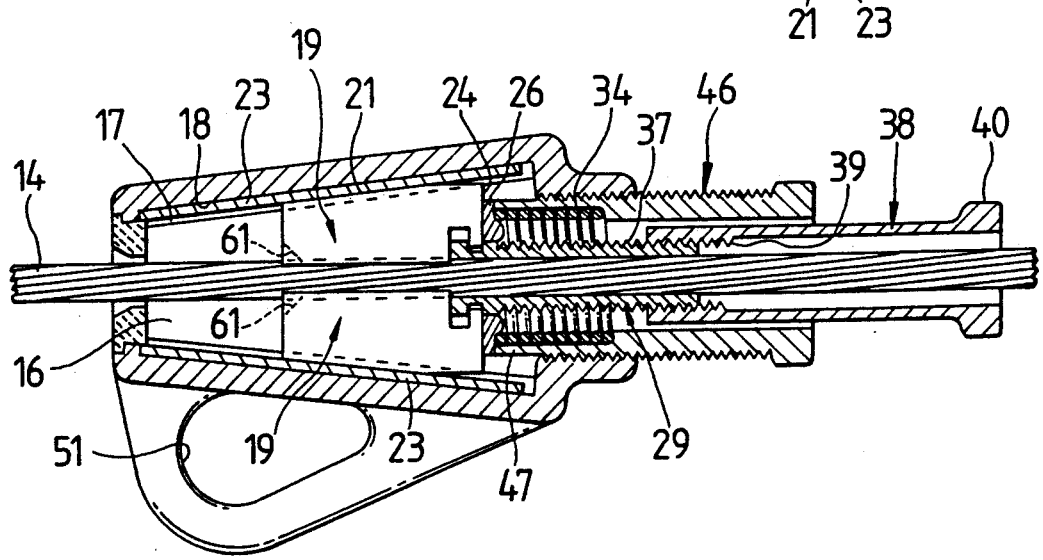
FIG. 6 is a sectional view as in FIG. 5 showing the locking sleeve holding the grippers against a cable.
Figure 7:
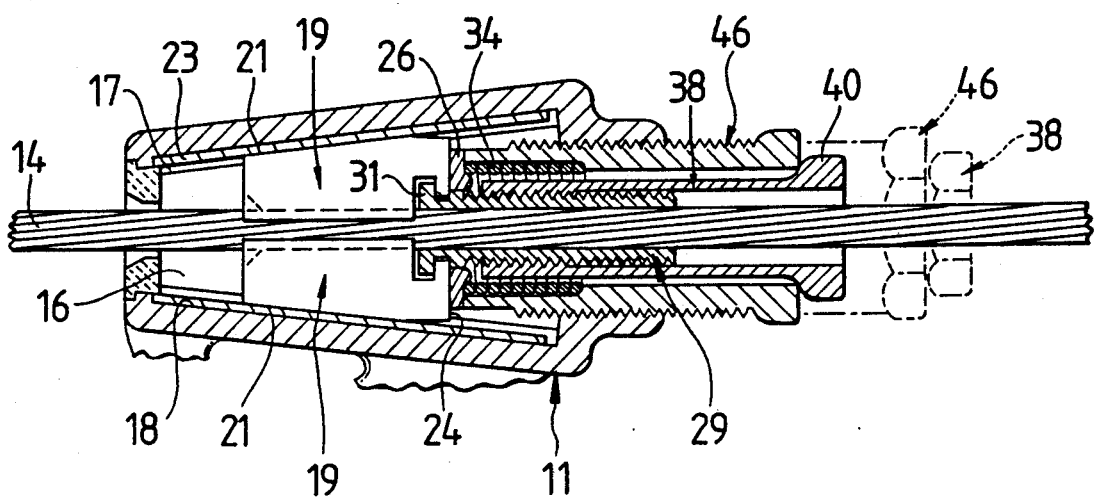
FIG. 7 is a sectional view as in FIG. 5 showing the apparatus in the operative position.

An alternative embodiment is shown in FIGS. 5 and 6. Note that in this embodiment a lock down sleeve 46 is threadedly engaged within the major opening 13 of housing 11 and has a spring seat formed therein to receive compression spring 34 within. The sleeve is concentric about the spring 34, the retractor guide 29, and the retractor 38, and is of sufficient length that the inner end thereof 47 may be urged against annular bearing member 26 while the cable is held by the gripper elements 19. The outer end of the sleeve 46 has an annular flange 48 formed thereon and adapted for engagement by a turning tool. Also note that the retractor 38 extends completely through the sleeve 46 with flange 40 in abutting relationship with the outer end of sleeve 46.

Regardless of which embodiment is utilized, the gripping action and range taking action is the same. As may be seen in FIGS. 3 and 4, the gripper elements 19 are restrained from rotational movement by the sidewalls of recess 17 and have gripping faces 22 which are independent of the diameter of the cable inserted. Thus the limiting factor on the size of the cable which can be secured by the apparatus is the size of the opening available along the axis of the housing.

Figure 9:
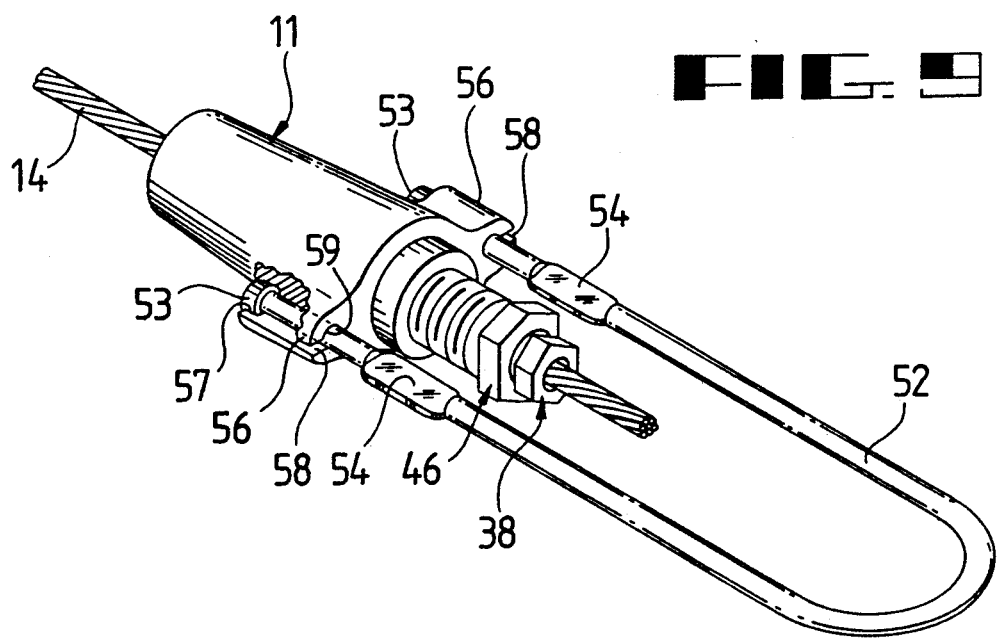
FIG. 9 is a perspective view of the apparatus of FIG. 5.

Note that the embodiments shown in FIGS. 1-3, 5 and 6 also include a pulling eye 51 formed on the housing to facilitate tensioning the cable 14 after insertion. FIG. 9 illustrates an optional bail 52 which is a U-shaped metallic rod having a knob 53 formed on each end thereof and having a flattened region 54 spaced from each knob 53. A pair of bail receptacles 56 are formed on opposite sides of the housing and have formed therein a seat 57, a laterally opening slot 58, and a circular passageway 59 bisected by the slot 58. The slot 58 is smaller than the diameter of the bail 52, yet wide enough to allow the flattened region 54 pass therethrough, thus the bail 52 is attached by aligning the flattened regions 54 with the slot 58 and inserting the region into the slot. Once inserted, the bail may be drawn axially along the passageway 59 to seat the knob 53. The flattened region is thus out of alignment with the slot and therefore the bail cannot move laterally through the slot.

Figure 8:
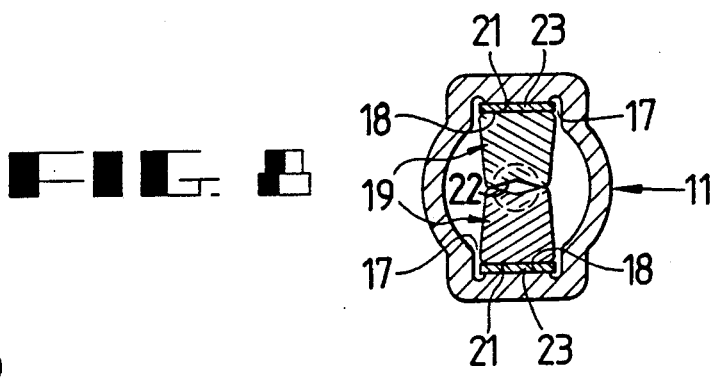
FIG. 8 is a sectional view taken along line 8—8 of FIG. 5.

In operation, a cable 14 is inserted through the minor aperture 12 and encounters the gripping elements 19. The formed inner edge 61 of the elements 19 is beveled such that axial pressure applied by urging the cable thereagainst urges the gripper elements 19 against the spring 34 and outwardly such that the cable passes between the faces 22 thereof and through the retraction guide 29. As shown in FIGS. 3, 6 and 8, the cable 14 may extend completely through the apparatus. As is well known in the art, attempted retraction of the cable 14 wedges the gripper elements between the cable 14 and the housing 11 thus firmly securing the cable 14 in the apparatus. To lock the apparatus shown in FIG. 2 to the cable, the retractor 38 is turned to bring the flange 40 into contact with the housing 11 and the annular cap 42 is threaded onto the housing 11 to capture the flange 40 and hold it in place. Thus, even if the tension in the cable 14 is released the gripping elements 19 are held in place by the retractor guide 29 which is engaged by the retractor 38 which cannot move, therefore the cable 14 remains securely held within the apparatus. When it is desired to remove the apparatus from the cable 14, the end cap 42 is removed using a conventional turning tool such as an adjustable wrench and the retractor 38 is rotated, while bearing against the housing 11 such that the threaded connection therewith of the retractor guide 29 causes the retractor guide to be urged toward the major aperture 13, thus pulling the guide elements 19 along therewith into a region of larger diameter such that the gripper elements are not urged against the cable. Note that the compressive force of the spring 34 is overcome by the movement of the retractor 38. In the alternate embodiment locking of the gripper 19 to the cable 14 is accomplished by rotating locking sleeve 46 until the inner end thereof abuts the annular bearing element 26 and thus urges the gripper elements against the cable 14. To release the cable 14, the locking sleeve 46 is rotated to move toward the major aperture 13 and then the retractor 38, with flange 40 bearing against the sleeve 46 is rotated as previously described.

To those familiar with the art, the foregoing embodiments present a marked improvement over the cable ends currently in use and provide consistent lockable gripping action which can be selectively released without damage to either the cable or device. It should also be understood that the present invention may be configured as a splice by connecting a pair of the disclosed embodiments with the major opening 13 in abutting relationship.

While I have shown my invention in various forms, it will be obvious to those skilled in the art that it is not so limited but is susceptible of various changes and modifications without departing from the spirit thereof.

I claim:

1. Apparatus for gripping a cable or the like comprising:
   (a) a housing having an axial bore which tapers from a larger first end to a smaller second end;
   (b) a pair of spaced apart planar slide plates mounted to the interior of said housing in opposition;
   (c) cable engaging members having opposing cable engaging faces and planar outer faces mounted in sliding contact with said pair of planar slide plates for relative movement therealong said cable engaging faces terminating in a beveled surface which allows insertion of said cable therebetween; and
   (d) means for urging said cable engaging members toward said second end such that said opposing cable engaging faces are urged toward abutment with each other, including an annular bearing member positioned within said housing and slidably received within said cable engaging members and a compression spring mounted within said housing and bearing against said annular bearing member to urge said cable engaging members toward said second end.

2. Apparatus for gripping a cable or the like comprising:
   (a) a housing having an axial bore which tapers from a larger first end to a smaller second end;
   (b) a pair of planar slide plates mounted to the interior of said housing in opposition;
   (c) cable engaging means having opposing cable engaging faces and planar outer faces mounted in sliding contact with said pair of planar slide plates for relative movement therealong with each of said cable engaging members being tapered from a thicker end to a narrower end such that the planar outer faces are substantially parallel to the taper of said axial bore and said cable engaging faces are substantially parallel to the longitudinal axis of said housing; and
   (d) means for urging said cable engaging members toward said second end including an annular bearing member abutting said cable engaging members distal said smaller end and a spring-like member retained within said housing in abutting relationship with said annular bearing member opposite said cable engaging members; and
   (e) means for disengaging said cable engaging members from said cable to remove said cable from said apparatus including a first tubular member adapted to receive said cable therethrough and having a first end operatively connected to said cable engaging members to effect concomitant axial motion therewith and independent radial motion relative thereto, said tubular member having a second end having a threaded surface threadedly engaging a threaded inner surface of a first end of a second tubular member with said first and second tubular members being relatively rotatable to move said first tubular member axially within said second tubular member.

3. Apparatus as defined in claim 2 further comprising means for locking said cable engaging members in gripping engagement with said cable.

4. Apparatus as defined in claim 3 further comprises means for disengaging said cable engaging members from said cable to remove said cable from said apparatus.

5. Apparatus as defined in claim 2 further comprising means for disengaging said cable engaging members from said cable.

6. Apparatus as defined in claim 2 wherein said housing has formed in the inner surface thereof a pair of opposed recesses adapted to receive said slide plates therewithin and to guide said cable engaging members.

7. Apparatus as defined in claim 6 wherein each of said cable engaging members are tapered from a thicker end to a narrower end such that the planar outer faces are substantially parallel to the taper of said axial bore and said cable engaging faces are substantially parallel to the longitudinal axis of said housing.

8. Apparatus as defined in claim 2 wherein said second tubular member has an annular flange extending radially from its outer surface at a second end thereof, said annular flange adapted for engagement by a turning tool.

9. Apparatus as defined in claim 8 wherein said annular flange abuts said housing upon insertion of said second tubular member into said first end of said housing.

10. Apparatus as defined in claim 2 further comprising means for locking said able engaging members in gripping engagement with said cable.

11. Apparatus as defined in claim 10 wherein said locking means comprises an annular sleeve threadedly engaging said housing and cooperatively abutting said annular bearing member or said disengaging means to hold said cable clamping members in engagement with said cable.

12. Apparatus as defined in claim 10 wherein said locking means comprises a tubular sleeve threadedly engaging said housing proximal said first end such that relative rotation thereof causes said tubular sleeve to move axially within said housing about said disengaging means, said tubular sleeve having a first end adapted to engage said annular bearing member and a second end external of said housing adapted for engagement by a turning tool and having an outermost portion adapted to abut an annular flange carried by said second tubular member at a second end thereof.

13. Apparatus as defined in claim 10 wherein said locking means comprises an annular cap threadedly engaging said housing proximal said first end and extending radially inwardly proximal said first end to enclose said disengaging means within said housing.

14. Apparatus as defined in claim 2 wherein said first tubular member has an outwardly opening annular recess proximal yet spaced from said first end thereof and each of said cable gripping elements has a transverse recess formed in the cable gripping face thereof proximal one end thereof for receiving said first end of said first tubular member therein in interlocking relationship.

15. Apparatus for automatically gripping a cable or the like comprising:
  (a) a housing defining an internal cavity which is a substantially conical surface having an apex and a base region with the longitudinal axis of said housing being open at said apex and base region, said conical surface having a pair of spaced apart linear recesses formed therein converging from said base region to said apex and aligned with said longitudinal axis;
  (b) means slideably mounted within said pair of linear recesses for gripping a cable inserted through said apex long said longitudinal axis including a plurality of opposing cable gripping surfaces aligned parallel to said longitudinal axis with each cable gripping surface terminating in a beveled surface proximal said apex for receiving a cable therebetween such that insertion of said cable therein urges said cable engaging means along said linear recesses; and
  (c) biasing means mounted within said housing for urging said cable gripping means toward said apex such that said cable gripping surfaces are urged toward abutment with each other, including an annular bearing member positioned within said housing and engaging said gripping means and a compression spring mounted within said housing and bearing against said annular bearing member to urge said gripping means toward said apex.

16. Apparatus as defined in claim 15 further comprising means for selectively disengaging said gripping means from said cable to remove said cable from said apparatus.

17. Apparatus as defined in claim 16 further comprising means for selectively locking said gripping means in gripping engagement with said cable.

18. Apparatus as defined in claim 15 further comprising means for selectively locking said gripping means in gripping engagement with said cable.

19. Apparatus as defined in claim 15 further comprising a wear plate positioned in each recess between said housing and said gripping means.

20. Apparatus as defined in claim 15 wherein said gripping means comprises a metallic member slidably positioned in each one of said pair of linear recesses having a gripping face which has a pair of generally planar elongated sections extending substantially parallel to said longitudinal axis, said sections extending outwardly from the longitudinal centerline of said gripping face forming an included obtuse angle.

21. Apparatus for automatically gripping a cable or the like comprising:
  (a) a housing defining an internal cavity which is a substantially conical surface having an apex and a base region with the longitudinal axis of said housing being open at said apex and base region, said conical surface having a plurality of linear recesses formed therein aligned with said longitudinal axis, each of said pair of linear recesses defined by a planar surface formed in said housing and inclined substantially parallel to said conic surface;
  (b) means slidably mounted within said pair of linear recesses for gripping a cable inserted along said longitudinal axis including a planar portion abutting said planar surface and a cable gripping surface extending substantially parallel to said longitudinal axis;
  (c) biasing means mounted within said housing for urging said cable gripping means toward said apex, including an annular bearing member positioned within said housing adjacent said gripping means and a compression spring mounted within said housing and bearing against said annular bearing member to urge said gripping means toward said apex; and
  (d) means for selectively disengaging said gripping means from said cable to remove said cable from said apparatus including a first tubular member inserted within said cavity and receiving said cable therethrough having one end adapted for connection to said gripping means for concomitant axial movement therewith and independent radial movement relative thereto and a second end having an extended thread formed thereon to engage a threaded second tubular member such that relative rotation therebetween moves said first tubular member axially relative to said second tubular member.

22. Apparatus as defined in claim 21 wherein said second tubular member has a radially outwardly extending flange formed on one end thereof distal said first tubular member.

23. Apparatus as defined in claim 22 further comprising a tubular sleeve threadedly engaging said housing at the base of said cavity such that relative rotational motion therebetween causes said tubular sleeve to move axially within said housing selectively to a locking position abutting said annular bearing surface and to a non-locked position spaced axially from said annular bearing surface, said tubular sleeve having an outer end extending from said housing and terminating intermediate said housing and said radially outwardly extending flange.

24. Apparatus as defined in claim 22 further comprising an annular cap threadedly engaging said housing to restrain said radially external annular flange from axial motion.

25. Apparatus as defined in claim 24 wherein said flange is captured between said housing and said annular cap.

* * * * *